(12) United States Patent
Dow et al.

(10) Patent No.: US 9,690,701 B1
(45) Date of Patent: Jun. 27, 2017

(54) PROBABILISTIC, PARALLEL COLLECTION OF MEMORY NO LONGER IN USE

(71) Applicant: INTERNATIONAL BUSINESS MACHINES CORPORATION, Armonk, NY (US)

(72) Inventors: Eli M. Dow, Wappingers Falls, NY (US); Thomas D. Fitzsimmons, Poughkeepsie, NY (US); Jia Sen Wu, Jiangsu (CN); Bao Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/277,234

(22) Filed: Sep. 27, 2016

(51) Int. Cl.
*G06F 17/30* (2006.01)
*G06F 12/02* (2006.01)

(52) U.S. Cl.
CPC .... *G06F 12/0253* (2013.01); *G06F 17/30864* (2013.01); *G06F 2212/702* (2013.01)

(58) Field of Classification Search
CPC ........................ G06F 12/0253; G06F 17/30864
See application file for complete search history.

(56) References Cited

U.S. PATENT DOCUMENTS

| | | | | |
|---|---|---|---|---|
| 4,907,151 A * | 3/1990 | Bartlett | ............... | G06F 12/0253 711/166 |
| 6,321,240 B1 * | 11/2001 | Chilimbi | ............... | G06F 8/4442 |
| 6,526,422 B1 | 2/2003 | Flood et al. | | |
| 7,139,784 B2 | 11/2006 | Knobe et al. | | |
| 8,990,171 B2 * | 3/2015 | Kalach | ............. | G06F 17/30159 707/664 |
| 2006/0253498 A1 * | 11/2006 | Barrs | .................. | G06F 12/0269 |
| 2007/0011415 A1 * | 1/2007 | Kaakani | ............. | G06F 12/0269 711/159 |
| 2013/0132647 A1 * | 5/2013 | Melik-Martirosian | | G06F 12/0246 711/103 |
| 2013/0318132 A1 * | 11/2013 | Basu | .................. | G06F 12/0276 707/816 |
| 2014/0129539 A1 * | 5/2014 | Hayes | ............... | G06F 17/30864 707/709 |

(Continued)

FOREIGN PATENT DOCUMENTS

WO      0077644 A1      12/2000

OTHER PUBLICATIONS

Azule Systems Inc., [online];[retrieved on Sep. 26, 2016]; retrieved from the Internet https://www.azul.com/resources/azul-technology/azul-c4-garbage-collector/. Tene et al.,"C4: The Continuously Concurrent Compacting Collector" pp. 79-88.

*Primary Examiner* — Noosha Arjomandi
(74) *Attorney, Agent, or Firm* — Cantor Colburn LLP; Steven Chiu

(57) ABSTRACT

A computer-implemented method includes performing, by each of a plurality of crawlers, a random walk of a plurality of objects in a heap, where the plurality of objects are memory objects allocated for execution of an application. A timestamp of each object of the plurality of objects is updated, when the object is visited by a crawler of the plurality of crawlers. Garbage is identified, by a computer processor, based at least in part on the timestamp of each object of the plurality of objects. The garbage is reclaimed.

17 Claims, 4 Drawing Sheets

(56) References Cited

U.S. PATENT DOCUMENTS

| | | | |
|---|---|---|---|
| 2014/0201126 A1* | 7/2014 | Zadeh | G06K 9/627 706/52 |
| 2014/0344216 A1* | 11/2014 | Abercrombie | G06F 17/30575 707/609 |
| 2015/0067293 A1* | 3/2015 | Flood | G06F 12/0269 711/170 |
| 2015/0193493 A1 | 7/2015 | Junqueira et al. | |
| 2015/0212852 A1* | 7/2015 | Gschwind | G06F 9/467 707/703 |
| 2015/0234743 A1* | 8/2015 | Little | G06F 12/0253 707/816 |
| 2015/0356007 A1* | 12/2015 | Bacon | G06F 12/0253 711/159 |
| 2016/0117114 A1* | 4/2016 | Heller, Jr. | G06F 3/0608 711/166 |
| 2016/0364177 A1* | 12/2016 | Anderson | G06F 12/00 |

\* cited by examiner

PROBABILISTIC, PARALLEL COLLECTION OF MEMORY NO LONGER IN USE

BACKGROUND

Embodiments of the present invention relate to garbage collection and, more specifically, to probabilistic, parallel collection of memory no longer in use.

Memory management ensures that a computer's memory is being used effectively, and memory management systems generally include garbage collection. Garbage collection is a process of reclaiming memory no longer in use by an application, thereby freeing up that memory for reuse. In some garbage collection, an object is considered to be no longer in use if it is unreachable, and an object is generally considered reachable if it is referenced, either directly or indirectly, by at least one object in use by the application.

A commonly used mechanism of garbage collection is mark-sweep, which includes a marking phase followed by a sweeping phase. During the marking phase, a crawler performs a tree traversal from each element of a root set of the program, and marks each object reached during that traversal. Marking introduces collection pauses, also known as Stop the World (STW) phases, in which the user application is suspended. During the sweeping phase, the memory is scanned for marks, and unmarked objects are reclaimed as garbage.

SUMMARY

According to an embodiment of this disclosure, a computer-implemented method includes performing, by each of a plurality of crawlers, a random walk of a plurality of objects in a heap, where the plurality of objects are memory objects allocated for execution of an application. A timestamp of each object of the plurality of objects is updated, when the object is visited by a crawler of the plurality of crawlers. Garbage is identified, by a computer processor, based at least in part on the timestamp of each object of the plurality of objects. The garbage is reclaimed.

In another embodiment, a system includes a memory having computer-readable instructions and one or more processors for executing the computer-readable instructions. The computer-readable instructions include performing, by each of a plurality of crawlers, a random walk of a plurality of objects in a heap, where the plurality of objects are memory objects allocated for execution of an application. Further according to the computer-readable instructions, a timestamp of each object of the plurality of objects is updated, when the object is visited by a crawler of the plurality of crawlers. Garbage is identified, based at least in part on the timestamp of each object of the plurality of objects. The garbage is reclaimed.

In yet another embodiment, a computer program product for garbage collection includes a computer readable storage medium having program instructions embodied therewith. The program instructions are executable by a processor to cause the processor to perform a method. The method includes performing, by each of a plurality of crawlers, a random walk of a plurality of objects in a heap, where the plurality of objects are memory objects allocated for execution of an application. Further according to the method, a timestamp of each object of the plurality of objects is updated, when the object is visited by a crawler of the plurality of crawlers. Garbage is identified, based at least in part on the timestamp of each object of the plurality of objects. The garbage is reclaimed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A significant drawback in conventional garbage collection is due to Stop the World (STW) phases, which are necessary for conventional marking to work. The length of the pause in a STW phase is generally based on the number of objects in use by an application. Thus, large applications are likely to have unreasonable pause lengths. Further, these pauses can prove detrimental to applications that have timing requirements.

According to some embodiments, however, a marking phase for marking objects in a memory heap for the purpose of garbage collection can be performed in garbage collection without the need for a STW phase. To this end, one or more cleaners may crawl the objects, marking them to update a timestamp of each object upon visiting that object. The crawlers may visit each object with equal chance, which can be achieved through the use of a random walk algorithm. With these multiple cleaners, a concurrent and parallel, deterministic algorithm may identify the garbage objects. In some embodiments, transactional memory is used to perform these tasks without the use of locks.

Figure 1:
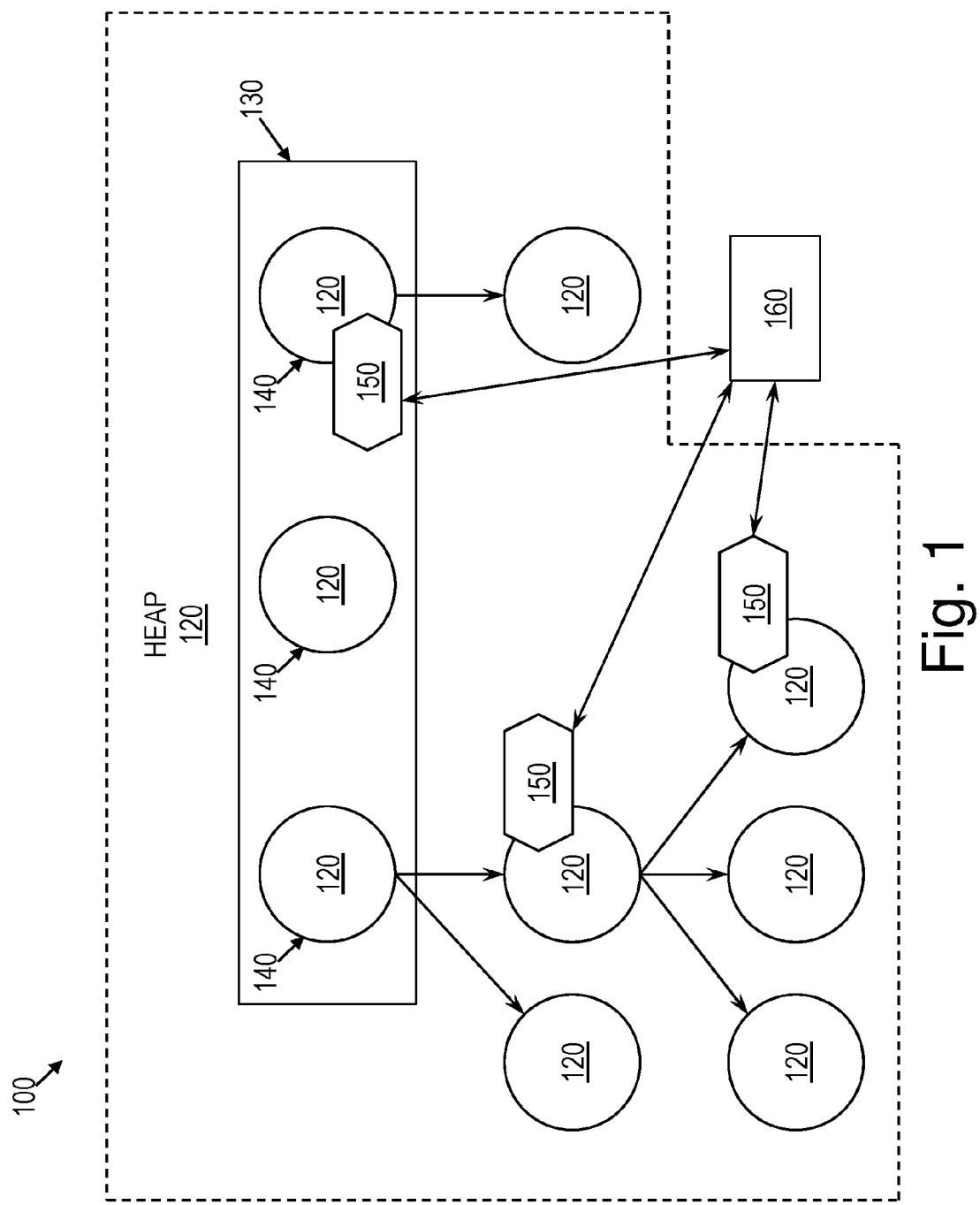
FIG. 1 is a diagram of a garbage-collection system, according to some embodiments of this invention.

FIG. 1 is a diagram of a garbage-collection system 100, according to some embodiments of this invention. As shown, the garbage-collection system 100 may operate on a heap 110, which may include objects 120 that have been allocated for an application, also referred to as a program. The heap 110 may include a root set 130 of objects 120, which are referred to herein as root objects 120. A root object 120 may be accessible from outside the heap 110, while other objects 120 need not be accessible from outside the heap 110. In a programming language that has only strong references, objects 120 in the heap 110 can either be reachable or unreachable from the program. The set of reachable objects 120 may be determined by the set of class variables and method variables in the program pointing to objects 120 in the heap 110. This set of class variables and method variables may be the root set, and thus the objects 120 associated with these class variables and method variables may be the root objects 120. Each object 120 may, but need not, reference other objects 120 in the heap 110. As a result, the root objects 120 may act as roots for one or more trees 140 of objects 120.

Each object 120 may be associated with a timestamp, which may be stored locally at the object 120, for example, and which may indicate the most recent time at which the object 120 was visited by a crawler 150. A counter 160 may keep time, such as by way of access to a logical clock, and the counter 160 may determine the current time for the purpose of providing the timestamps. Each time a crawler 150 visits an object 120, the crawler 150 may update the timestamp of the object 120. Each object 120 whose timestamp lags behind the current time, as kept by the counter 160, by at least a threshold difference may be considered potential garbage, as will be described in more detail below.

The heap 110 may be formed according to convention, as the application runs. The heap 110 may include at least one tree 140, having a root that is a root object 120. According to some embodiments, each directed edge between objects 120 within the heap 110 may be associated with a probability, which may be established as the heap 110 is formed during application execution.

Figure 2:
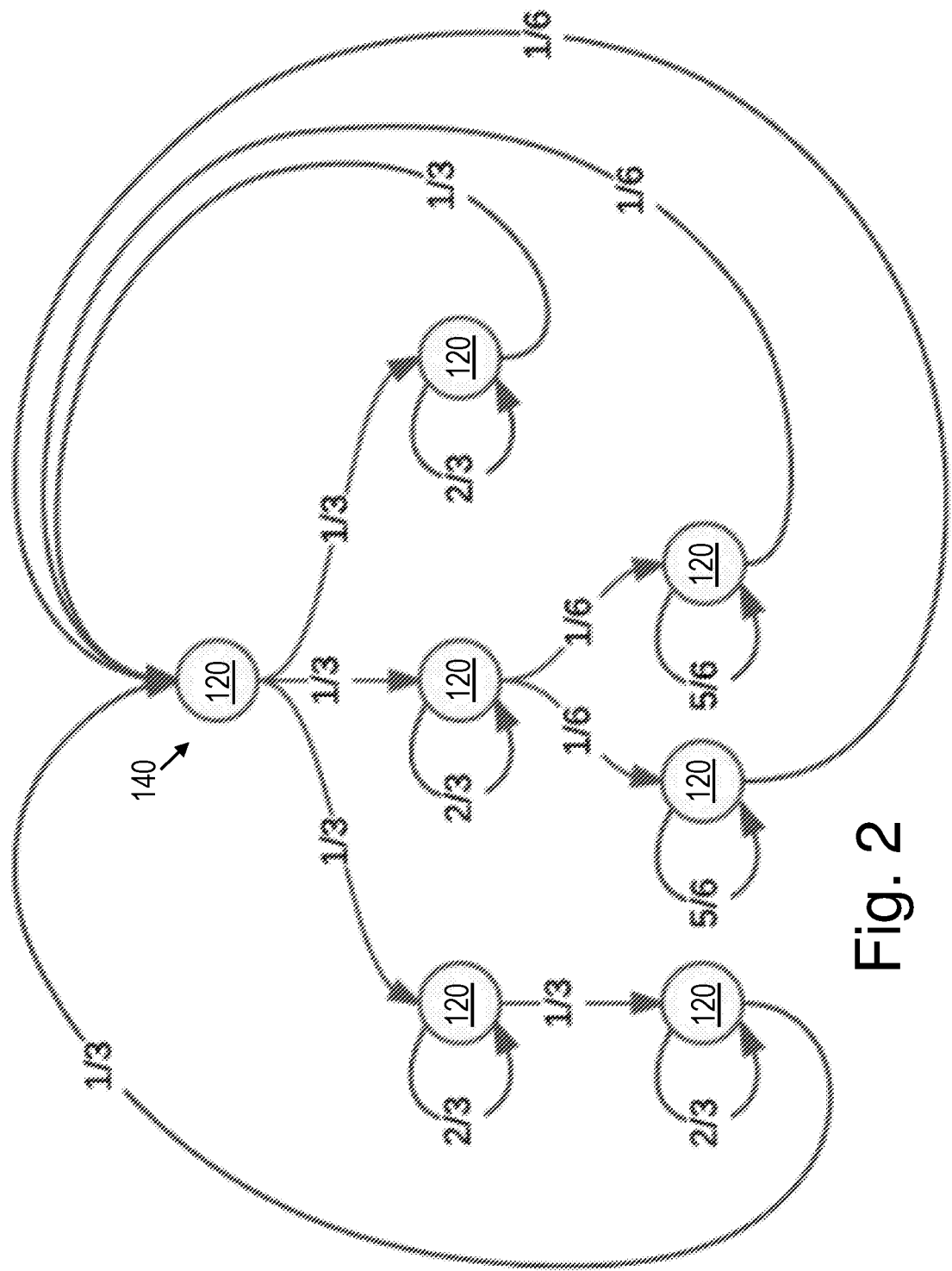
FIG. 2 is a diagram of an example tree of objects in a heap of the application, according to some embodiments of this invention.

FIG. 2 is a diagram of an example tree 140 of objects 120 in the heap 110, where the objects 120 act as nodes of the tree 140, according to some embodiments. Various edges provide one or more paths through the tree 140 from object 120 to object 120. Each edge may be a directed edge and may be adjacent to a source object 120, from which the edge starts, and a target object 120, where the edge ends. Each edge from a source object 120 to a target object 120, where the source object 120 and the target object 120 are distinct, may represent a reference in the source object 120 to the target object 120. The garbage-collection system 100 may further include loop edges, where a loop edge has a source object 120 that is the same as its target object 120. In some embodiments, with the exception of root objects 120, each object 120 may have an associated loop edge of which that object 120 is both the source object 120 and the target object 120. These loop edges may make the transitions between objects 120 along the edges doubly stochastic.

As shown in FIG. 2, each edge may be associated with a corresponding fraction, which may be the probability of taking a path along that edge when a crawler 150 currently points to a source object at which that edge starts. The value of each probability may depend on various factors. A root object 120 may have k children and thus an out-degree of k and a 1/k probability to reach each child. At each object 120, when the incoming probability is p, the probability to stay, by way of the associated loop edge, may be 1/p while the probability to leave, by way of an edge that is not a loop edge, may be p. If the object 120 is not a leaf node of the tree 140, then the probability to reach each child of the object may be p/k. If the object 120 is a leaf node, however, then the crawler 150 may return to the root object 120 of the tree with probability p. As shown by the example of FIG. 2, each object may thus have a total incoming probability of 1 and a total outgoing probability of 1, including the probability for the loop edge as both incoming and outgoing. As known in the art, a transition matrix can represent this tree 140, and given the above description, the resulting transition matrix may be doubly stochastic.

One or more crawlers 150 may travel through the heap 110, each starting at a root object 120 and performing a random walk. Each crawler 150 may travel through the heap 110 based on the probabilities of the edges, selecting an edge to follow from a current object 120 according to on the probabilities of the outgoing edges from that object 120. It will be understood that, in some embodiments, multiple crawlers 150 are used. Thus, while this disclosure occasionally refers to a single crawler 150, it will be understood that operations applicable to a single crawler 150 may similarly be applied to other crawlers 150.

In some embodiments, when each of the crawlers 150 performs a random walk through a pure tree, the garbage-collection system 100 reaches a uniform stationary distribution with respect to which objects 120 are visited. The various crawlers 150 may be scattered evenly across the objects 120, with each crawler 150 deciding whether to stay or move based on the probabilities described above.

An actual tree 140 in the heap 110 may differ from a pure tree, in that cross-references may exist between objects 120 in the tree 140. However, in practice, these cross-references need not have a great effect on the distribution of the crawlers 150, given that objects 120 receiving an additional chance to be reached, due to a cross-reference, have the same additional chance to be left by a crawler 150.

The number of crawlers 150 used may determine how frequently each object 120 is visited and thus updated (i.e., given an updated timestamp). For instance, the more crawlers 150 that are used, the more frequently each object 120 may be updated. However, because multiple crawlers 150 are being used in some embodiments, two or more crawlers 150 may enter a race condition for a single object 120, or a crawler 150 and the counter 160 may enter a race condition for access to the current time. These conflicts may become more likely and may occur more frequently with a greater number of crawlers 150. Further, additional conflicts may occur during the sweeping phase.

While some embodiments may employ a lock for each object 120 and for access to the time, other embodiments may handle conflicts by other mechanisms. In some embodiments, race conditions would not be rare, and use of a lock for each object 120 might cause extreme overhead.

Thus, in some embodiments, the garbage-collection system 100 may use transactional memory, also referred to as hardware transactional memory, managed by a transactional-memory facility. Specifically, the tree 140, objects 120, and counter 160 may be stored in transactional memory. For example, the International Business Machines® z Architecture (z/Architecture) may include the feature of transactional memory, and may be used to implement some embodiments.

With transactional memory, a crawler 150 may speculatively update an object 120 when it desires to update that object 120, and the counter 160 may speculatively increase the time when it desires to increase the time. The crawler 150 or counter 160 may detect a conflict if one exists. In the case of a conflict, the crawler 150 or counter 160 may automatically retry the task. In some embodiments, the transactional-memory facility may also protect each object's child objects 120 (i.e., the objects 120 that are target objects 120 of edges leading from that object 120), which may be stored in a list, such that there are no conflicts with respect to the number of child objects 120 of an object 120 or with respect to identification of those child objects 120. A central processing unit (CPU) performing operations of the garbage-collection system 100 may manage the atomicity load, ensuring each object 120 or time update is consistent with other updates.

As discussed above, each crawler 150 may step through the tree 140, moving between objects 120 along edges, based on the probabilities given by the edges. According to some embodiments, when an object 120 is reached, it can be assumed that the object 120 is thus reachable and is not garbage at the time of being reached by a crawler 150. Thus, the older an object's timestamp is, indicating when that object 120 was last visited by a crawler 150, the more likely that the object 120 is no longer reachable and is thus garbage.

Accordingly, in an identification phase, some embodiments identify garbage based in part on the timestamps of the objects 120. A threshold difference in time may be established. When an object 120 has a timestamp with a time that lags behind the current time, as given by the counter 160, by more than the threshold difference, then that object 120 may be a candidate for garbage collection. Analogously, in some embodiments, an object 120 with a timestamp within the threshold difference of the current time is not a candidate for garbage collection. However, in some embodiments, the timestamp alone is not enough to determine whether an object 120 is garbage, as the reason for an old timestamp may simply be that no crawler has arrived at the associated object 120 despite being able to reach that object 120. Thus, a deterministic algorithm may be used to refine the selection of which objects 120 are garbage.

To identify garbage, the garbage-collection system 100 may scan the heap 110 during the identification phase to identify candidate objects 120, where the candidate objects 120 are candidates for garbage collection based on their timestamps. For example, and not by way of limitation, this scanning may be performed by a CPU executing the application. In some embodiments, the scanning may be performed in the same or a similar manner in which scanning is conventionally performed for the purpose of marking. During the scanning, objects 120 are identified as candidate objects 120 when they are determined to have timestamps lagging behind the current time by at least the threshold difference. These candidate objects 120 may be added to a candidate list. Additionally, each parent object 120 of an identified candidate object 120 may be deemed a boundary object 120, if the parent object 120 does not also have a timestamp lagging behind the current time by at least the time difference, and added to a boundary list. If the parent object 120 lags behind the current time by at least the time difference, then that parent object 120 may likewise be deemed a candidate object 120.

In some embodiments, this scanning is performed concurrently and in parallel with the marking phase, during which crawlers 150 visit and update objects 120, as described above. In some cases, the timestamp of an object 120 may fall behind the current time by the threshold difference during the scanning, and may thus not be deemed a candidate object 120 during that scan. In this case, however, the object 120 in question may be added to the candidate list during the next scan and thus little to no harm is done by having missed the object 120. Further, in some embodiments, the heap 110 may be divided into two or more segments, and the various segments may be scanned in parallel for increased efficiency.

A candidate object 120 in the candidate list may be deemed to be real garbage if it cannot be reached from any boundary object 120 in the boundary list. In some embodiments, each chain of edges connecting a boundary object 120 to a candidate object 120 is short and has a high probability given the probabilities assigned to the edges. Thus, visiting a candidate object 120 that is reachable, and thus not garbage, from a boundary object 120 may take a short period in traversal starting from that boundary object 120.

During the identification phase, after the scanning is complete, the garbage-collection system 100 may eliminate candidate objects 120 as potential garbage, based on those candidate objects being reachable from boundary objects 120. The boundary objects 120 can be viewed as separating non-garbage objects 120 from objects 120 that are potentially garbage. In some embodiments, the garbage-collection system 100 may traverse the subtree rooted at each boundary object 120. This traversal may be deterministic, such that all objects 120 reachable from a boundary object 120 are actually reached. When a candidate object 120 is reached during this traversal, that candidate object 120 may be removed from the candidate list. After the identification phase completes, the candidate list may contain candidate objects 120 that are deemed to be garbage, as they were not reached and removed from the candidate list during the identification phase. The remaining objects 120 in the candidate list may then be reclaimed as garbage.

In some cases, a boundary object 120 may become unreachable while garbage is being identified in the candidate list. In that case, the garbage-collection system 100 may fail to identify as garbage the candidate objects 120 connected by edges to that boundary object 120. In that case, however, the garbage-collection system 100 may identify those candidate objects 120 as garbage during the next scan. Thus, in some embodiments, due to parallel operation of the marking phase and the identification phase, identification of garbage may be delayed but not missed in some cases.

In some embodiments, the actual reclamation of garbage identified as described above may be performed in a sweeping phase, which may occur in the same manner, or a similar manner, as a sweeping phase in conventional garbage collection. Further, to ensure that no crawler 150 attempts to update or follow an edge from invalid storage, each crawler 150 currently pointing at an object 120 deemed to be garbage (e.g., still in the candidate list) may be revoked. In some embodiments, each crawler 150 may have an associated revocation flag, and thus a crawler 150 may be revoked by setting that flag. As a result, the transactional-memory facility may restart that revoked crawler 150 at a root object 120.

Figure 3:
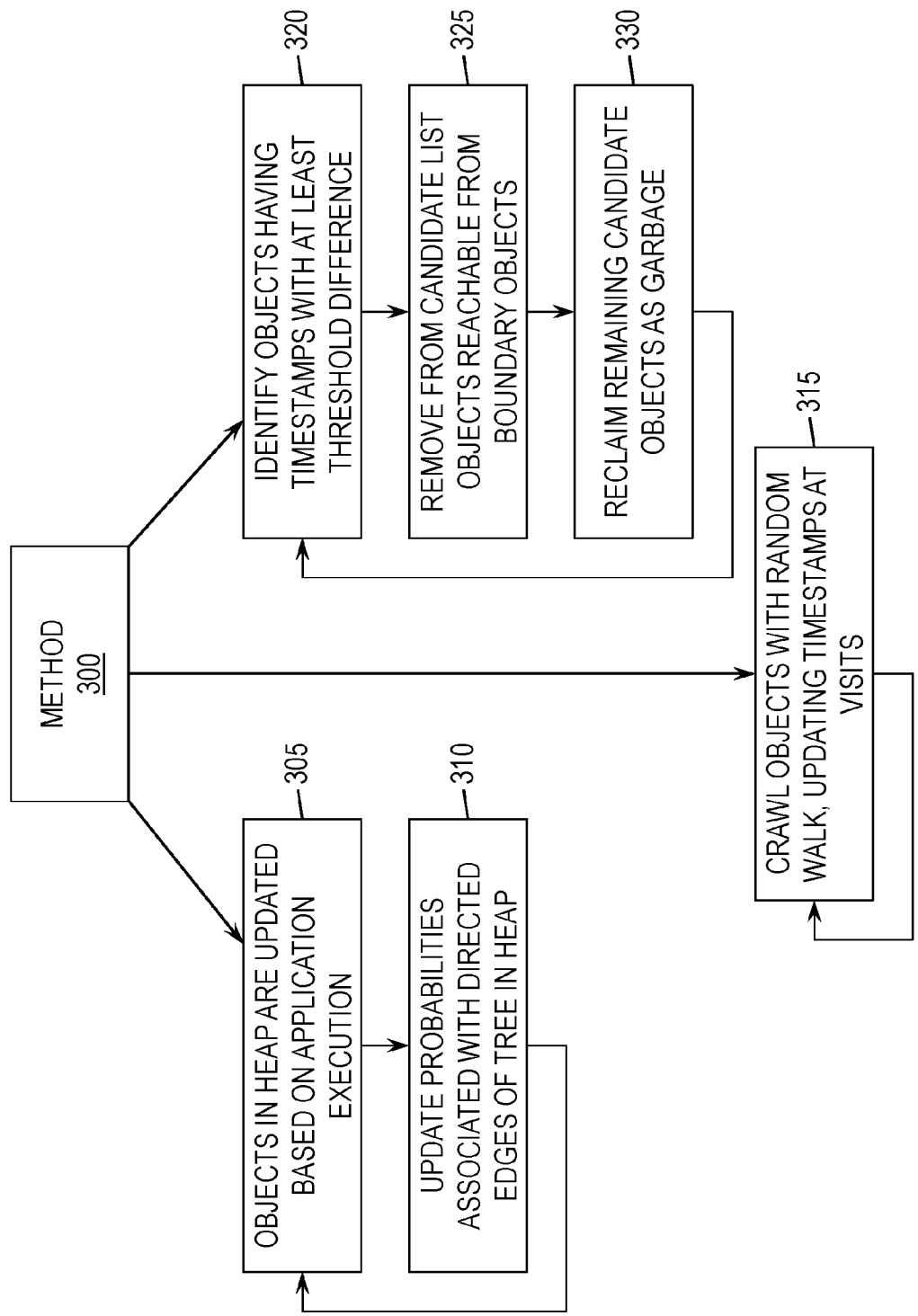
FIG. 3 is a flow diagram of a method for collecting garbage of the application, according to some embodiments of this invention.

FIG. 3 is a flow diagram of a method 300 for collecting garbage of an application, according to some embodiments of this invention. As discussed above, and as shown in FIG. 3, the marking phase and identification phase may occur in parallel. Additionally, these phases may occur in parallel with execution of the application for which the garbage collection is being performed. In that manner, the memory may be reclaimed without use of a STW phase. As the application runs, cross-references between objects 120 in the heap 110 may change. As these cross-references change, the probabilities associated with the edges the applicable tree 140 may be updated to maintain the probabilities described above.

At block 305, during application execution, the set of objects 120 in the heap 110 are updated as needed, which can include adding objects, deleting objects, or modifying objects. At block 310, the probabilities associated with edges between the objects may be updated based on the update to the set of objects.

At block 315, in the marking phase, two or more crawlers 150 may crawl the objects 120 in the heap, with each crawler 150 following a random walk algorithm. Each time a crawler 150 visits an object 120, the crawler 150 may update a timestamp of the object 120 to the current time, as determined by the counter 160. The crawlers 150 may continue to crawl the objects 120 and update timestamps as long as garbage collection is desired.

At block 320, in the identification phase, the garbage-collection system 100 may identify each object 120 having a timestamp with more than a threshold difference from the current time, and may add each such object 120 to a candidate list. Further, each parent object 120 of each candidate object 120, where that parent object 120 does not also have a timestamp that lags behind the current time by the threshold difference, may be added to a boundary list. At block 325, the garbage-collections system 100 may identify which candidate objects 120 are reachable from the boundary objects 120, and may remove those candidate objects 120 from the candidate list. At block 330, the remaining candidate objects 120 in the candidate list may be reclaimed as garbage.

Figure 4:
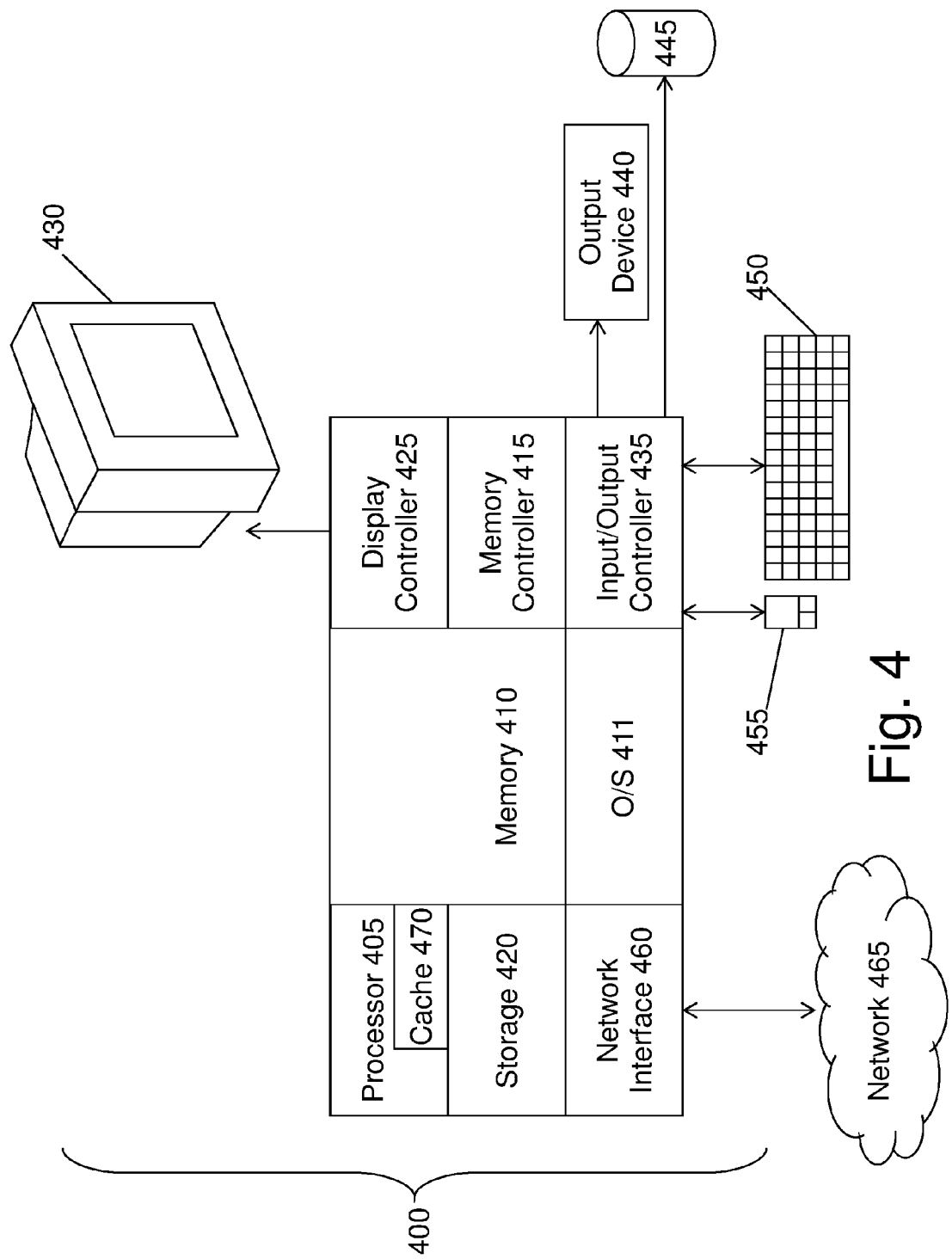
FIG. 4 is a block diagram of a computer system for implementing some or all aspects of the garbage-collection system, according to some embodiments of this invention.

FIG. 4 illustrates a block diagram of a computer system 400 for use in implementing a garbage-collection system 100 or method according to some embodiments. The garbage-collection systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the garbage-collection systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Garbage-collection systems 100 and methods according to this disclosure may be embodied, in whole or in part, in computer program products or in computer systems 400, such as that illustrated in FIG. 4.

Technical effects and benefits of some embodiments of the garbage-collection system 100 include the ability to reclaim memory no longer in use by an application, without having to pause the application during a Stop the World phase. The result may be improved efficiency, as compared to conventional garbage collection. Further, in some embodiments, further efficiency may be achieved through the use of transactional memory, rather than conventional locks, to enable various phases of the garbage-collection system 100 to be performed in parallel.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
performing, by each of a plurality of crawlers, a random walk of a plurality of objects in a heap, wherein the plurality of objects are memory objects allocated for execution of an application, and wherein the plurality of objects form a tree;
associating a probability with each directed edge of the tree;
wherein a total probability of directed edges entering each object of the plurality of objects equals a total probability of directed edges exiting the object;
wherein each object of one or more objects, from among the plurality of objects, comprises a loop edge both entering and exiting the object;
wherein a transition matrix representing the tree is doubly stochastic;
updating a timestamp of each object of the plurality of objects, when the object is visited by a crawler of the plurality of crawlers;
identifying, by a computer processor, garbage based at least in part on the timestamp of each object of the plurality of objects; and
reclaiming the garbage identified.

2. The computer-implemented method of claim 1, wherein the performing the random walk, the updating the timestamp of each object, the identifying the garbage, and the reclaiming the garbage are performed without a Stop the World phase.

3. The computer-implemented method of claim 1, wherein the plurality of objects are visited by the plurality of crawlers with equal chance.

4. The computer-implemented method of claim 1, wherein the performing the random walk and the identifying the garbage are performed in parallel.

5. The computer-implemented method of claim 1, wherein the identifying the garbage based at least in part on the timestamp of each object of the plurality of objects comprises:
scanning the heap for a set of candidate objects having timestamps outside a threshold difference from a current time; and
identifying a subset of the candidate objects as the garbage.

6. The computer-implemented method of claim 5, wherein the identifying the subset of the candidate objects as garbage comprises:
identifying a set of boundary objects as parents of the set of candidate objects;
removing from the set of candidate objects one or more objects that are reachable from the set of boundary objects; and
identifying a remainder of the candidate objects as the garbage, after removing from the set of candidate objects the one or more objects that are reachable from the set of boundary objects.

7. A system comprising:
a memory having computer-readable instructions; and
one or more processors for executing the computer-readable instructions, the computer-readable instructions comprising:
performing, by each of a plurality of crawlers, a random walk of a plurality of objects in a heap, wherein the plurality of objects are memory objects allocated for execution of an application, and wherein the plurality of objects form a tree;
associating a probability with each directed edge of the tree;
wherein a total probability of directed edges entering each object of the plurality of objects equals a total probability of directed edges exiting the object;
wherein each object of one or more objects, from among the plurality of objects, comprises a loop edge both entering and exiting the object;
wherein a transition matrix representing the tree is doubly stochastic;
updating a timestamp of each object of the plurality of objects, when the object is visited by a crawler of the plurality of crawlers;
identifying garbage based at least in part on the timestamp of each object of the plurality of objects; and
reclaiming the garbage identified.

8. The system of claim 7, wherein the performing the random walk, the updating the timestamp of each object, the identifying the garbage, and the reclaiming the garbage are performed without a Stop the World phase.

9. The system of claim 7, wherein the plurality of objects are visited by the plurality of crawlers with equal chance.

10. The system of claim 7, wherein the performing the random walk and the identifying the garbage are performed in parallel.

11. The system of claim 7, wherein the identifying the garbage based at least in part on the timestamp of each object of the plurality of objects comprises:
scanning the heap for a set of candidate objects having timestamps outside a threshold difference from a current time; and
identifying a subset of the candidate objects as the garbage.

12. The system of claim 11, wherein the identifying the subset of the candidate objects as garbage comprises:
identifying a set of boundary objects as parents of the set of candidate objects;
removing from the set of candidate objects one or more objects that are reachable from the set of boundary objects; and
identifying a remainder of the candidate objects as the garbage, after removing from the set of candidate objects the one or more objects that are reachable from the set of boundary objects.

13. A computer-program product for garbage collection, the computer program product comprising a computer readable storage medium having program instructions embodied therewith, the program instructions executable by a processor to cause the processor to perform a method comprising:

performing, by each of a plurality of crawlers, a random walk of a plurality of objects in a heap, wherein the plurality of objects are memory objects allocated for execution of an application, and wherein the plurality of objects form a tree;

associating a probability with each directed edge of the tree;

wherein a total probability of directed edges entering each object of the plurality of objects equals a total probability of directed edges exiting the object;

wherein each object of one or more objects, from among the plurality of objects, comprises a loop edge both entering and exiting the object;

wherein a transition matrix representing the tree is doubly stochastic;

updating a timestamp of each object of the plurality of objects, when the object is visited by a crawler of the plurality of crawlers;

identifying garbage based at least in part on the timestamp of each object of the plurality of objects; and reclaiming the garbage identified.

14. The computer-program product of claim 13, wherein the performing the random walk, the updating the timestamp of each object, the identifying the garbage, and the reclaiming the garbage are performed without a Stop the World phase.

15. The computer-program product of claim 13, wherein the plurality of objects are visited by the plurality of crawlers with equal chance.

16. The computer-program product of claim 13, wherein the performing the random walk and the identifying the garbage are performed in parallel.

17. The computer-program product of claim 13, wherein the identifying the garbage based at least in part on the timestamp of each object of the plurality of objects comprises:

scanning the heap for a set of candidate objects having timestamps outside a threshold difference from a current time;

identifying a set of boundary objects as parents of the set of candidate objects;

removing from the set of candidate objects one or more objects that are reachable from the set of boundary objects; and identifying a remainder of the candidate objects as the garbage, after removing from the set of candidate objects the one or more objects that are reachable from the set of boundary objects.

* * * * *